Jan. 12, 1954  F. H. DEXTER  2,665,559
LIQUID TREATING APPARATUS
Filed July 14, 1950  3 Sheets-Sheet 1

FRED H. DEXTER,
INVENTOR.

HUEBNER, BEEHLER, WORREL,
HERZIG & CALDWELL,
ATTORNEYS.

BY

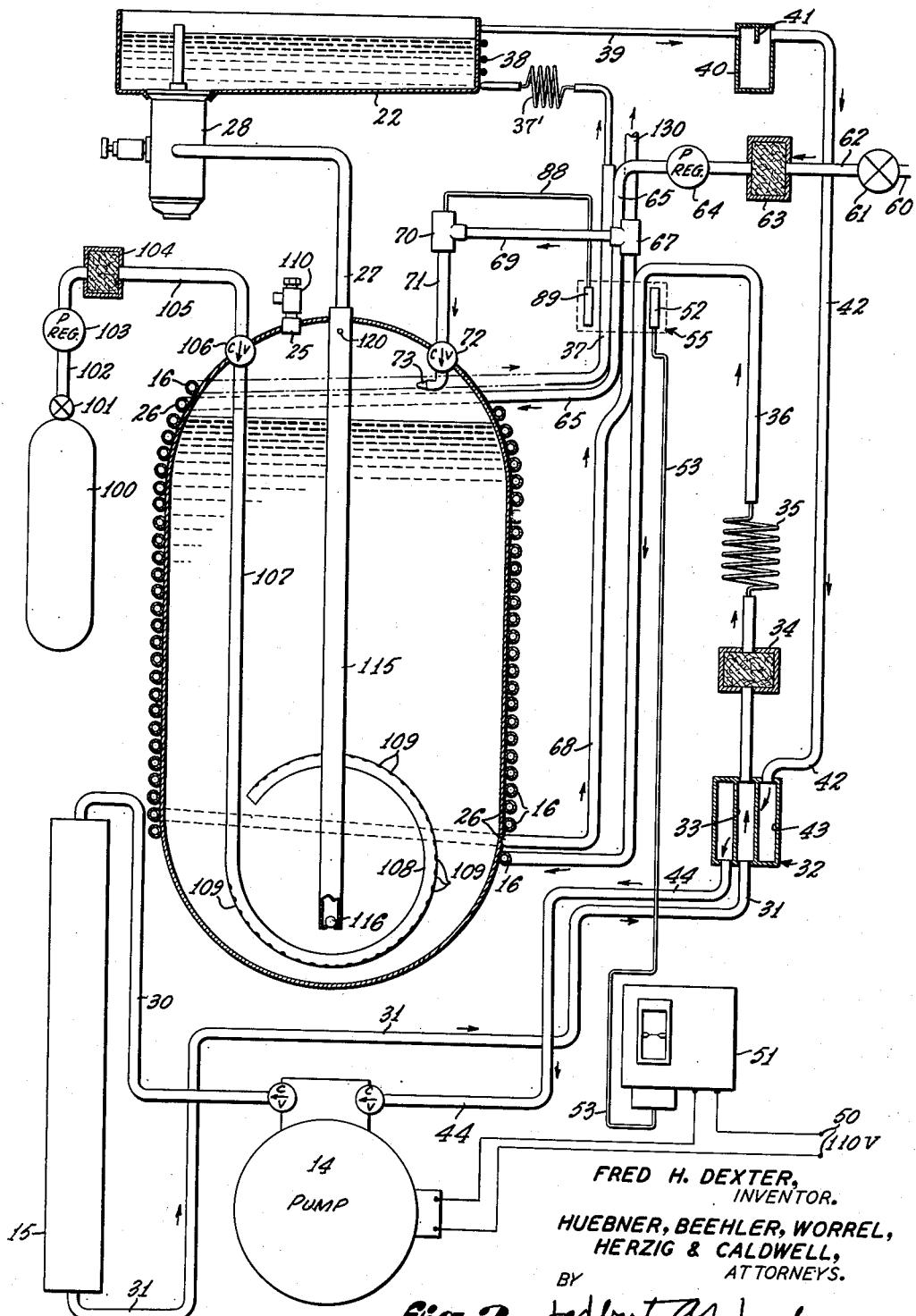

Jan. 12, 1954  F. H. DEXTER  2,665,559
LIQUID TREATING APPARATUS
Filed July 14, 1950  3 Sheets-Sheet 3
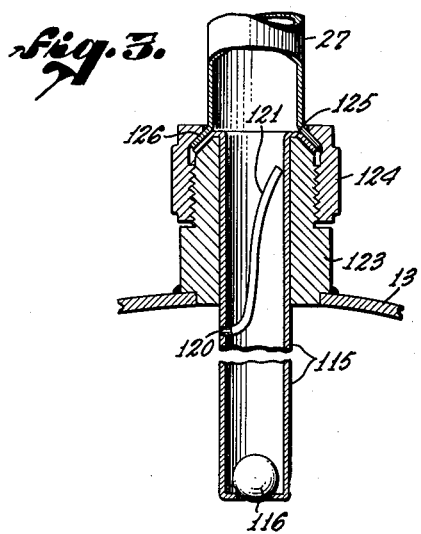
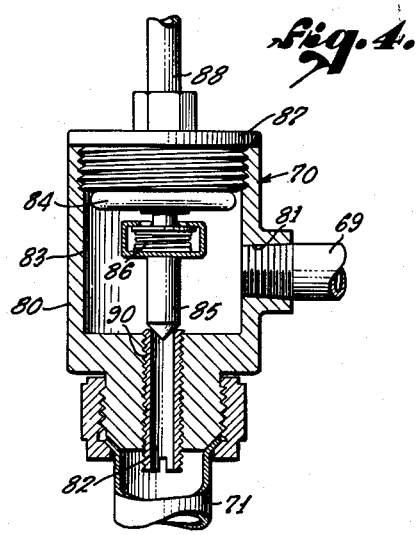
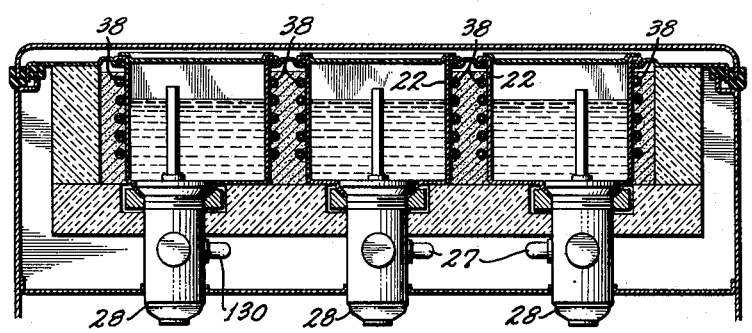
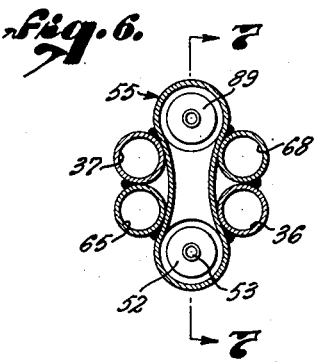
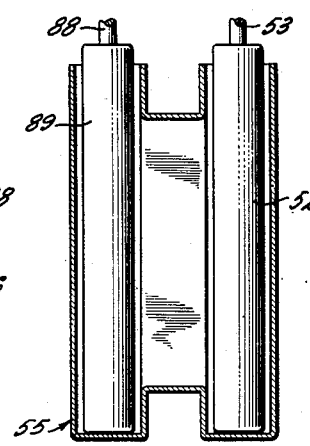
FRED H. DEXTER,
INVENTOR.
HUEBNER, BEEHLER, WORREL,
HERZIG & CALDWELL,
ATTORNEYS.

Patented Jan. 12, 1954

2,665,559

UNITED STATES PATENT OFFICE 2,665,559

LIQUID TREATING APPARATUS

Fred H. Dexter, Monrovia, Calif.

Application July 14, 1950, Serial No. 173,727

7 Claims. (Cl. 62—4)

My invention relates in general to liquid treating apparatus and specifically to liquid cooling carbonation and dispensing and in some particulars has reference to improved details of construction of the type dispenser shown in my copending application Serial No. 88,651, filed April 20, 1949, for a Low Pressure Carbonator.

A great many carbonated drink dispensers are known to the art, but such dispensers as heretofore used, have been subject to certain defects which require relatively expensive equipment to overcome. Most of the soft drink dispensers involve the use of a water storage tank having means for introducing a carbon dioxide gas into the water under pressure. Most of the heretofore known dispensers operate at a relatively high pressure, making it essential to install a pressure boosting pump on the water line.

It is well known that the amount of carbon dioxide which will be dissolved in water is an inverse function of the temperature and a direct function of the pressure and lack of agitation.

It is one of the objects of my invention to provide a carbonating means whereby both the carbon dioxide and the water may be introduced into the carbonating storage tank at relatively low pressure, but which results in a high absorption of carbon dioxide.

In the heretofore known carbonated drink dispensers, water and carbon dioxide have been introduced into a storage tank at a rate equal to the highest consumption load, and unless a relatively expensive, large-capacity refrigerating system is employed, the temperature of the water will gradually rise as it is replaced at a rapid rate and the percentage of carbonation will drop accordingly. High influx rates also tend to agitate the water with consequent lowering of carbon dioxide content.

It is also one of the objects of my invention to provide means for controlling the rate of introduction of water, whereby the limits of a practical refrigeration system will not be surpassed.

It is a further object of my invention to provide a tank for mixing and storage of carbonated water which is without any water level controls, such as float valves, electrical controls, pumps or the like, thereby materially reducing the initial cost of manufacturing and subsequent maintenance cost.

A further advantage results from my invention. When water level controls are employed, water in the tank, at 35° F. will continue to absorb carbon dioxide. Over long periods of nonuse, such as over night, the water tends to become overcharged which is wasteful and undesirable.

In systems employing my invention, that is where no water level control is employed, the tank tends to fill with water so that no further $CO_2$ can be absorbed.

In such carbonated storage tanks it has been found necessary to "bleed" or purge the tank of most carbonated beverage dispensers, because of the tendency to collect air and/or excess carbon dioxide in the top thereof, thereby reducing the storage capacity for carbonated water. It is among the objects of my invention to provide means whereby the top of the tank will automatically purge itself during use.

It is also a further object of my invention to provide means for introducing the carbon dioxide and water into the carbonated water storage tank, whereby a proper absorption of carbon dioxide will be obtained without the necessity of mechanical agitators or mixers.

Other and further objects and advantages will become apparent from the drawings and specifications relative thereto.

In the drawings:

Figure 2 is a schematic representation of the dispenser shown in Figure 1.

Figure 3 is an enlarged sectional detail of the discharge pipe from the storage tank.

Figure 4 is an enlarged sectional detail of a valve adapted to control the flow of water into the storage tank.

Figure 5 is a sectional view taken on line 5—5 of Figure 1.

Figure 6 is an enlarged sectional view of the automatic refrigeration and water supply controls.

Figure 7 is a sectional view taken on line 7—7 of Figure 6.

Figure 1:
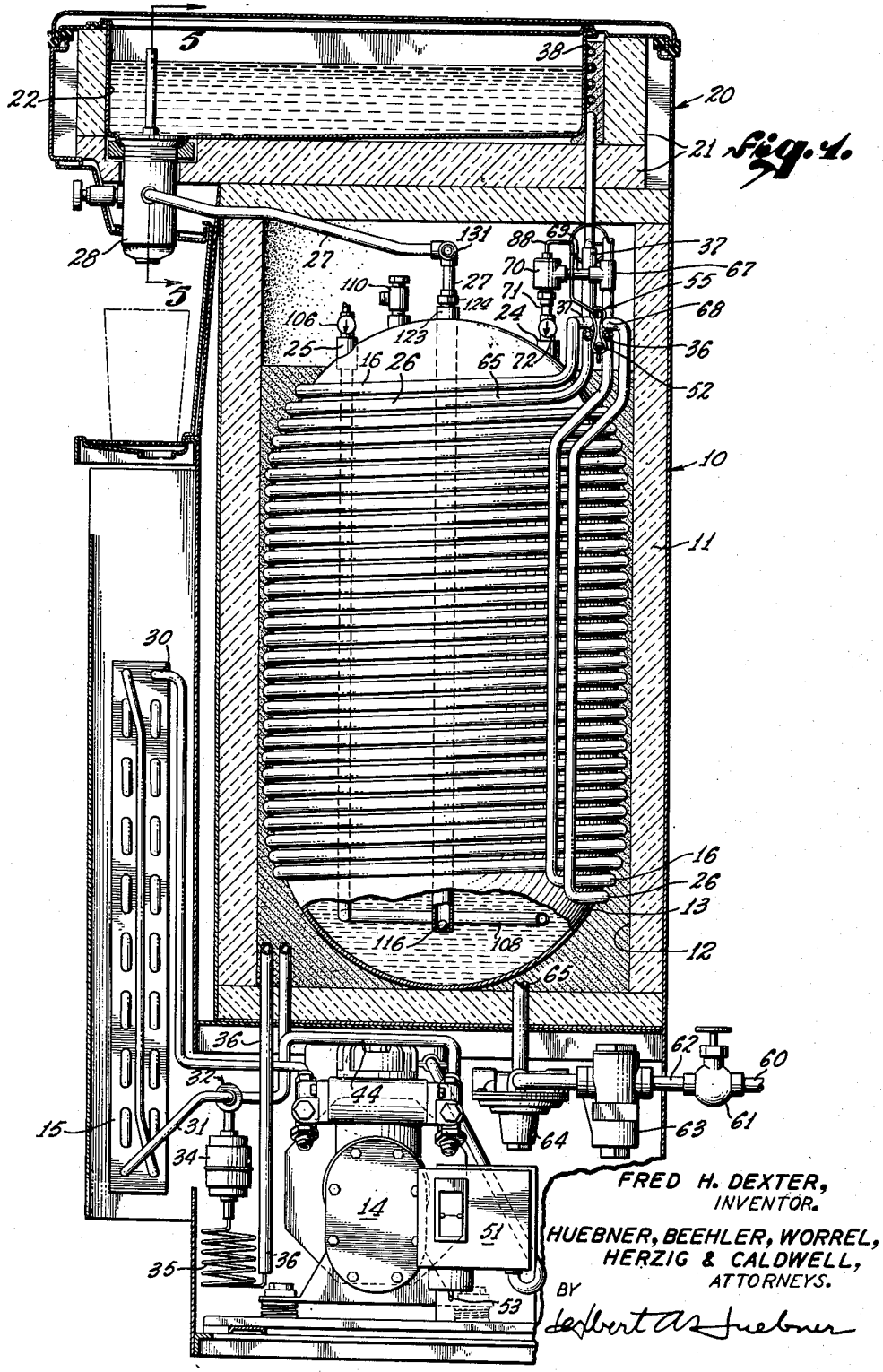
Figure 1 is a side sectional elevation of a carbonated beverage dispenser embodying the principles of my invention.

The following description of my invention will be divided into three principal subdivisions, namely, the general construction, the refrigerating system, and the carbonating system.

General construction

The general physical construction of one preferred embodiment comprises a substantially rectangular housing 10 having insulation 11 defining a chamber 12 within which is disposed a storage tank 13. A motor compressor assembly 14 is disposed in the base of the cabinet and is adapted to pump refrigerant to a condenser unit 15 and into an expansion coil 16. The expansion coil 16 is helically wound in intimate contact with the outer surface of the tank 13, whereby the contents thereof may be refrigerated by the expansion of the refrigerant in the coil 16.

The cabinet is formed with a top section designated generally 20, having insulated walls 21 forming a chamber adapted to receive a syrup tray 22. The refrigerating coil 16 also extends upwardly and connects with a second refrigerating coil 38 which is in intimate contact with the syrup tray 22 so that the syrup may also be refrigerated.

Further details of the refrigerating system will be explained in a later subdivision of this specification.

The tank 13 is provided with a water inlet 24 and a carbon dioxide inlet 25. The water inlet 24 is supplied by a water coil 26 helically wound in intimate contact with the outer surface of the tank 13 and alternately disposed between loops of the coils 16. The water will therefore be precooled by the coils 16 before being introduced into the storage tank 13.

Carbonated water may be withdrawn from the tank from a discharge conduit 27 into a dispensing valve 28. It will be understood that the dispensing valve 28 is also adapted to discharge simultaneously syrup from the tray 22 to thereby mix the desired carbonated beverage. It will also be understood that any suitable dispensing valve may be used. I, however, prefer to use the type valve shown in my copending application, Serial No. 161,385, filed May 11, 1950, for Dispensing Mixing Valve.

Unless some means is provided to present movement of the conduits making up coils 16 and 26, difficulty will probably be experienced because of radical temperature changes. The coils may be secured in place by soldering or brazing to the surface of the tank 13 or, as preferred by me, by filling the space in the chamber 12 between the housing 10 and the tank 13 as high as the upper end portion of the tank with concrete (Portland cement) and permitting it to set. The concrete may act as both a retainer for the coils and a thermal transfer medium. Hardened Portland cement is a good conductor of heat. In the arrangement illustrated, there is a heat transfer from the water coil to the cement to the refrigeration coil, also from the water in the tank to the wall of the tank to the cement and to the refrigeration coil.

Refrigerating system

In the following description of the refrigerating system, particular attention is directed towards Figure 2. Identifying numerals in Figures 1 and 2 indicate similar parts.

The pump 14 discharges through a check valve into conduit 30 and thence into the condenser unit 15. The condenser unit is connected by conduit 31 through a heat exchange designated generally 32, having a central passage 33, thence through a filter 34 into a capillary tube 35. The purpose of the capillary tube will be understood by those familiar with the art of refrigeration as a control or metering means for controlling the flow of compressed refrigerant through the refrigerating system.

The expansion coil 16 is connected to the capillary tube by means of conduit 36. The upper end of the coil 16 extends by means of the conduit 37 through a choke coil 37' to a secondary coil 38 in heat-transferring proximity to the syrup tray 22. The space between the walls 21 and the tray 22 wherein the coil 38 is located is also preferably filled with concrete for the same reasons as previously explained. Spent refrigerant returns from the coil 38 by means of conduit 39 through an accumulator trap 40 having a baffle 41 therein. A conduit 42 connects the accumulator 40 with the heat exchange unit 32 where the refrigerant passes through an outer chamber 43 that surrounds the chamber 33. Refrigerant is returned from the heat exchange unit 32 to the pump by means of conduit 44.

I desire to restrict the flow of refrigerant through the coil 38 in order to control the rate of evaporation therein and to prevent undue boiling in the coil 16. I show for such purpose the choke tube or capillary coil 37' (previously referred to) in the refrigerant line leading to the coil 38. This results in two separate evaporators having different operating pressures operating on one common refrigeration unit. Such a coil 37' is necessary if the diameter of the tubes in coils 16 and 38 is the same, and is not essential but would perform some function even if the diameter of the tube in coil 38 were to be made smaller than that of 16. What is desired is a drop in pressure.

Such construction aids in controlling the temperature of the syrup in the tank 22 without expensive control valves or equipment. By this means the syrup in tank 22 may be kept colder than the water in tank 13.

An electric motor which controls the pump 14 is energized by a source of current 50 which has in series therewith a pressure responsive switch 51. A remote pressure bulb 52 is connected to the pressure responsive switch 51 by means of a tube 53, so that pressure inside the bulb 52 is communicated to the switch 51 to thereby control the operation of the motor operating the pump 14.

Referring to Figures 6 and 7, it will be noted that the temperature responsive bulb 52 is enclosed in an envelope 55 and is positioned in heat-transferring relation with respect to conduits 36 and 37.

During the operation of the beverage dispenser, water withdrawn therefrom will be replaced from a source at ambient temperature, as will be later explained, and the temperature in the conduits 36 and 37 will tend to rise, thereby causing expansion of vapor or fluid in the bulb 52, closing of the switch 51 and operation of the pump 14. After the pump 14 has operated a sufficient length of time to cause the temperature in the conduits 36 and 37 to drop, the switch 51 will be opened by contraction of the vapor or fluid in the bulb 52, so that an automatic control is provided at all times to maintain the proper temperature in the system.

Carbonated water system

Water is introduced into the system from a supply source designated 60, to a valve 61 and a conduit 62. The conduit 62 preferably, but not necessarily, passes through a filter 63 and pressure regulator 64. The pressure regulator 64 is connected to the helically wound coil 26 by means of conduit 65. It will be recalled that the coil 26 is helically wound in intimate contact with the exterior surface of the tank 13 and is alternately disposed between the loops of the coil 16, and further, and it may be noted, that the flow of water therethrough is in a reverse direction from the flow of refrigerant through the coil 16. In other words, as illustrated, the refrigerant flows upwardly and the water flows downwardly so that a maximum heat transfer occurs prior to the introduction of water into the tank 13. By introducing the water from the supply source into the coil 26 at the top of the tank, the water flowing down the coil around the tank will be cooled sufficiently to avoid warming the carbonated water inside the tank at the bottom, whereas if the water were to enter the coil 26 at the bottom there would be a rise in the temperature of the carbonated water at the bottom of the tank where the dispensing outlet is located.

The lower end of the coil 26 is connected to a T-fitting 67 by a conduit 68. One side of the T-fitting 67 is connected by a conduit 69 to a control valve 70, thence into the tank 13 by conduit 71 through check valve 72 and spray nozzle 73.

For details of the control valve 70, reference is made to Figure 4. The valve comprises a housing 80 having an inlet aperture 81 and a discharge aperture 82. The housing 80 is formed with a chamber 83 into which is disposed an expandable member such as a bellows 84 having a valve element 85 connected thereto by means of a compression spring 86.

The bellows 84 is connected to a threaded insert cap or plug 87 through which passes an aperture in communication with a tube 88. The tube 88 is connected to a temperature pressure bulb 89.

The valve element 85 is adapted to seat against a valve seat formed in the upper end of a threaded tube 90 through which passage 82 extends.

It will therefore be readily apparent that temperature in bulb 89 will control the positioning of the valve 85 with respect to the valve seat 90 to thereby control the flow of water into the tank 13.

I prefer to charge the bellows 84 and the bulb 89 with liquid having satisfactory characteristics of thermal expansion, rather than gas, because a more accurate control is obtained even with variation in water pressure in the line 69.

Reference is again made to Figure 6 wherein the bulb 89 is shown disposed in the envelope 55 and in heat transferring relation with respect to conduits 65 and 68.

When water is being withdrawn from the storage tank 13 and replaced through the nozzle 73, the temperature of the water flowing through the conduits 65 and 68 will tend to rise, thereby tending to expand the liquid contained in the bulb 89. If the temperature of the water in the conduits 65 and 68 rises to a temperature above which the refrigerating system can not properly refrigerate the water before introduction into the tank, the valve 70 will tend to close or restrict the flow so that the refrigerating system will be able to handle the load.

It is therefore apparent that I have provided an automatic control for regulating water introduced into the tank 13, whereby water may not be introduced at a rate faster than the refrigerating system can cool it to the desired temperature to obtain satisfactory carbonation.

In view of the position of the temperature pressure responsive bulbs 52 and 89 which control the refrigerating system and the introduction of water into the tank 13 with respect to temperature transfers from the refrigerant conduits 36 and 37 and the water conduits 65 and 68, it becomes readily apparent that a rise in temperature in the water being introduced into the system will cause a restriction thereof and the simultaneous starting of the refrigerating system in order to handle the increased load, and that a drop in temperature of the water will have the opposite effect.

I have provided a source of carbon dioxide which comprises a $CO_2$ bottle 100 connected to the interior of the tank 13 by means of a valve 101, conduit 102, pressure regulator 103, filter 104, conduit 105, check valve 106 and a discharge conduit 107. The discharge conduit 107 extends downwardly to substantially the bottom of the tank 13, is formed with a loop 108 having a plurality of discharge ports 109.

The loop 108 is shown for clarity and illustration in a vertical position. It will be understood, however, that the preferred position is horizontal so that carbon dioxide being discharged through the ports 109 is spread uniformly over the entire body of water contained in the tank, lessening the agitation in the tank 13.

Carbon dioxide passing through the ports 109 rises and is largely absorbed as it passes upwardly through the refrigerated water in the tank 13 to the top, where excess is readily absorbed by water sprayed from the nozzle 73. There will be some additional absorption into the surface of the water body, and a supplementary absorption through the purging tube later described.

If desired, the tank may be provided with a pressure relief valve such as 110 of any standard construction designed to protect the tank 13 within any desired safe limits.

As previously explained, I have provided means for controlling the pressure of both the water and the carbon dioxide being introduced into the tank by means of the respective pressure regulators 64 and 103. I prefer to set the pressure regulators so that the pressure of the water is in excess of the pressure of the carbon dioxide being introduced, and, by means of the restriction of the nozzle 73, permit the immediate introduction of carbon dioxide when carbonated water is drawn off. In other words, the excess pressure of the water supply permits its introduction into the tank, but the restriction thereof permits an immediate introduction of carbon dioxide. By such means it is possible to introduce both carbon dioxide and water into the tank at relatively low pressures. The degree of absorption of carbon dioxide will be controlled by the temperature at which the water is introduced, and without agitation in the tank.

A discharge tube 115 extends downwardly to substantially the bottom of the tank 13 and is provided with a check valve means such as the ball 116 at the bottom thereof. The necessity of such check valve member will be understood from a further detailed description. The tube 115 communicates with the conduit 27 leading to the dispensing valve 28.

Referring to Figure 3, it will be noted that the upper end of the tube 115 is formed with an aperture 120 through which is inserted a capillary tube 121. In the usual carbonated beverage dispenser there is a tendency for air and excessive carbon dioxide to collect in the upper area of the storage tank, which thereby decreases the storage capacity and renders it mandatory that the tank be purged periodically in order to obtain satisfactory performance. Upon the withdrawal of the carbonated water through the tube 115, the passage of such water upward past the end of the capillary 121 automatically purges excess carbon dioxide or air trapped in the upper region of the storage tank 13, and because the $CO_2$ is lighter than the water, it will rise through the tube 121 where it will be absorbed by the water in the conduit 27.

Upon closing the dispensing valve 28, carbonated water contained in the tube 115 and the conduit 27, would run backwardly into the tank 13 to the level of the water therein if it were not for the presence of the check valve 116. Spitting and popping of the dispenser valve when first opened is therefore prevented by such check valve.

It will be noted in Figure 3 that the tank 13 is provided with a boss 123 having a union nut 124. The tube 115 and the conduit 27 are formed with flares 125 and 126 respectively, which are secured in fluid-tight engagement by means of the union nut 124.

In Figures 1 and 2, the T-fitting 67 is provided with a conduit 130 leading upwardly therefrom. Such conduit is provided in the event that multiple valves are used, for dispensing various flavored beverages, and it is desired that one of the beverages be dispensed or mixed with plain water. The conduit 130 leads to such plain water valve.

The conduit 27 as shown in Figure 1 is also provided with a fitting 131 so that more than one carbonated dispensing valve may be connected to the tank 13.

While I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent devices. Use is not limited to carbonating or cooling water, or water and syrup, but the apparatus is plainly adapted to the treatment of various liquids.

Having thus described my invention, what I claim as new and desire to secure by Letters Patent is.

1. In a low pressure carbonated liquid dispenser, the combination of a tank having carbonated liquid under pressure contained therein, a dispensing conduit, a valve for controlling the dispensing liquid therefrom, means for automatically purging said tank of excess gases, said means comprising a capillary tube communicating between said conduit and the interior of said tank adjacent the upper limit thereof, whereby gases collecting therein may be purged upon each opening of said valve, and check valve means disposed in said conduit below said tube so that liquid may not run downwardly into said tank upon closing of said dispensing valve.

2. In a liquid dispenser having a storage tank, a liquid supply conduit helically wound in intimate contact with said storage tank, a refrigerating coil helically wound in intimate contact with said storage tank and having loops alternately disposed between loops of said supply conduit and adapted to refrigerate said tank and supply conduit, a flow control valve adapted to control the flow of liquid in said supply conduit, and a temperature responsive device remote from said tank controlling said flow control valve and being responsive to the temperature of liquid in said supply conduit and said refrigerating coil, whereby liquid may not be introduced into said tank at a rate exceeding the capacity of said refrigerating means.

3. A low pressure carbonator comprising a tank, means for injecting water therein at a regulated pressure, means for injecting carbon dioxide therein at a regulated pressure less than said water pressure, refrigerating means for pre-cooling said water and for refrigerating said tank, and means responsive to the temperature of water being injected into said tank for controlling the rate of flow of water into said tank whereby the volume of water being injected into said tank can not exceed the capacity of said refrigerating means, said responsive means comprising a pressure responsive valve in series with said water injection means, and a remote pressure bulb adapted to control said pressure responsive valve and responsive to the combined temperatures of said water and said refrigerant.

4. A low pressure carbonator comprising a tank, restrictive means for injecting water therein at a regulated pressure, unrestricted means for injecting carbon dioxide therein at a regulated pressure less than said water pressure, refrigerating means for pre-cooling said water and for refrigerating said tank, and means responsive to the temperature of water being injected into said tank for controlling the rate of flow of water into said tank whereby the volume of water being injected into said tank can not exceed the capacity of said refrigerating means, said responsive means comprising a pressure responsive valve in series with said water injection means, and a remote pressure bulb adapted to control said pressure responsive valve and responsive to the combined temperatures of said water and said refrigerant.

5. A carbonated drink dispenser comprising an insulated housing, a tank in said housing for containing carbonated water under pressure, means for supplying pre-cooled water at a regulated pressure into said tank, said water supply means comprising a conduit having helical loops in intimate contact with the outer surface of said tank, a pressure responsive flow control valve, and restricting nozzle disposed inside said tank, means for pre-cooling said water and refrigerating the contents of said tank, said last named means comprising a refrigerating system having an expansion coil in intimate contact with said tank and alternately wound between the helical loops of the water system, and including a pressure responsive switch for actuating said refrigerating system, temperature responsive bulb means responsive to both ends of each of the water loop and expansion coil loop for controlling the water flow control valve and the pressure responsive switch, and carbonated water discharge means comprising a conduit extending adjacent the bottom of said tank and communicating with a discharge valve.

6. A carbonated drink dispenser comprising an insulated housing, a tank in said housing for containing carbonated water under pressure, restricted means for supplying pre-cooled water at a regulated pressure into said tank, said water supply means comprising a loop of conduit helically wound in intimate contact with the surface of said tank, a pressure responsive flow control valve and a restricting nozzle disposed inside said tank, means for pre-cooling said water and refrigerating the contents of said tank, said last named means comprising a refrigerating system having an expansion coil in intimate contact with said tank and alternately wound between the helical loops of the water system and including a pressure responsive switch for actuating said refrigerating system, temperature responsive bulb means responsive to both ends of each of the water loop and expansion coil loop for controlling the water flow control valve and the pressure responsive switch, means for carbonating the water in said tank comprising a source of carbon dioxide under pressure, and a conduit adapted to communicate said carbon dioxide to the bottom of said tank whereby carbon dioxide travels upwardly through the water, and carbonated water discharge means comprising a conduit extending adjacent the bottom of said tank and communicating with a discharge valve, said last mentioned conduit having a capillary tube communicating between the interior of said last mentioned conduit and the upper region of said tank interior, whereby excess gases may be purged upon opening said valve, and a check valve adjacent the bottom of said conduit whereby water can not run back into said tank upon closing said valve.

7. A carbonated drink dispenser comprising an insulated housing, a tank in said housing for containing carbonated water under pressure, restricted means for supplying pre-cooled water at a regulated pressure into said tank, said water supply means comprising a loop of conduit spirally wound in intimate contact with the surface of said tank, a pressure responsive flow control valve and a restricting nozzle disposed inside said tank, means for pre-cooling said water and refrigerating the contents of said tank, said last named means comprising a refrigerating system having an expansion coil in intimate contact with said tank and alternately wound between the spiral loops of the water system and including a pressure responsive switch for actuating said refrigerating system, temperature responsive bulb means responsive to both ends of each of the water loop and expansion coil loop for controlling the water flow control valve and the pressure responsive switch, means for carbonating the water in said tank comprising a source of carbon dioxide under pressure, and a conduit adapted to communicate said carbon dioxide to the bottom of said tank and terminating in a horizontal loop having a plurality of discharge ports therein, and carbonated water discharge means comprising a conduit extending adjacent the bottom of said tank and communicating with a discharge valve, said last mentioned conduit having a capillary tube communicating between the interior of said last mentioned conduit and the upper region of said tank interior, whereby excess gases may be purged upon opening said valve, and a check valve adjacent the bottom of said conduit whereby water can not run back into said tank upon closing said valve.

FRED H. DEXTER.

References Cited in the file of this patent
UNITED STATES PATENTS

| Number | Name | Date |
|---|---|---|
| 1,713,787 | Stinson | May 21, 1929 |
| 1,919,500 | Carpenter | July 25, 1933 |
| 2,276,964 | Grove | Mar. 17, 1942 |
| 2,291,768 | Siedle | Aug. 4, 1942 |
| 2,405,448 | Ritter | Aug. 6, 1946 |
| 2,432,546 | Tanner | Dec. 16, 1947 |
| 2,515,212 | Giffard | July 18, 1950 |
| 2,531,315 | Wyllie | Nov. 21, 1950 |